Patented Oct. 11, 1938

2,133,028

UNITED STATES PATENT OFFICE 2,133,028

MOLD RESISTING REMOISTENING TAPE

Ferdinand W. Humphner, Oak Park, Ill., assignor, by mesne assignments, to Mid-States Gummed Paper Company, a corporation of Delaware No Drawing. Application December 9, 1935, Serial No. 53,676

1 Claim. (Cl. 91—68)

This invention relates particularly to mold-resisting remoistening tape although the invention has broader uses.

One of the chief difficulties with gummed tape, and particularly with tape of the remoistening type, is the tendency for mold to develop on the tape after it has been applied to boxes, packages, etc. The mold results in the drawing of moisture into the adhesive and the weakening of the bond between the tape and the surface to which it is applied, thus causing the tape after a short while to fall away from such surface.

An object of the present invention is to develop a sturdy tape which meets all the requirements for a binding tape and in addition is mold resistant.

A further object is to treat tape surfaces with a material which does not weaken tape and which renders it highly resistant to mold and the like.

In the practice of my invention any paper having a fiber formation or mixture of fibers suitable for tape purposes may be selected and sized in the usual manner. The paper sheet is then covered on one side, or both sides, with the mold resisting solution, the coating being spread completely over the surface so as to seal any openings or pores in the sheet.

I have found that silicate of soda, as it is commonly made and sold, and having as usual a controlled alkalinity, meets the requirements for my new tape. I find that particularly good results can be obtained by applying a coating of silicate of soda in the proportion of approximately 15 to 20% to the dry weight of the paper, although greater or lesser amounts of the silicate of soda may be employed, if desired. It will be understood that the solution of silicate of soda will vary in density or concentration to meet the needs of the particular type of paper to which it is applied. If desired the coating may be applied to the paper at the time it is made on the paper machine.

The coating of silicate of soda efficiently resists the growth of mold and is effective even though the tape is handled roughly, bent or otherwise distorted in the application of the tape to a surface or edge. It has been found that mold of the types which tend to develop on tape is acid forming and grows best in an acid medium. The controlled alkalinity of the silicate of soda provides a medium which is unfavorable for the growth of such mold types. The solution of silicate of soda can be applied readily; it is persistent under adverse conditions of use and weather; and it is highly effective in resisting the growth of mold types which grow upon remoistening tape.

The new tape may be modified, if desired, by incorporating into the adhesive any suitable fungicide, or the like, such as for example, sodium-orthophenylphenate.

The foregoing detailed description has been given for clearness of understanding only, and no unnecessary limitations should be understood therefrom, but the appended claim should be construed as broadly as permissible, in view of the prior art.

I claim:

Gummed tape of the character set forth, comprising: a paper strip having one side thereof covered with a coating of gum normally dry but adapted to be rendered adhesive through the application of moisture and on the opposite side thereof a coating of silicate of soda completely covering said side.

FERDINAND W. HUMPHNER.